(12) United States Patent
Ribadeneira Mejia

(10) Patent No.: US 7,870,969 B2
(45) Date of Patent: Jan. 18, 2011

(54) CONTAINER HAVING LOCKING BUTTRESSES FOR FLIP-TOP CAP

(75) Inventor: Luis Ernesto Ribadeneira Mejia, Trumbull, CT (US)

(73) Assignee: Conopco, Inc., Englewood Cliffs, NJ (US)

( * ) Notice: Subject to any disclaimer, the term of this patent is extended or adjusted under 35 U.S.C. 154(b) by 419 days.

(21) Appl. No.: 12/154,938

(22) Filed: May 28, 2008

(65) Prior Publication Data

US 2008/0296247 A1 Dec. 4, 2008

(30) Foreign Application Priority Data

May 30, 2007 (GB) .................................. 0710225.4

(51) Int. Cl.
*B65D 41/00* (2006.01)
*B65D 43/02* (2006.01)
*B65D 47/06* (2006.01)

(52) U.S. Cl. .................. 215/321; 215/235; 215/317; 215/318

(58) Field of Classification Search .............. 215/235, 215/317, 318, 321
See application file for complete search history.

(56) References Cited

U.S. PATENT DOCUMENTS

| | | | | |
|---|---|---|---|---|
| 3,110,410 | A * | 11/1963 | Pehr | 215/243 |
| 4,230,232 | A | 10/1980 | Atkins | |
| 4,807,786 | A * | 2/1989 | Gueret | 222/499 |
| D441,640 | S * | 5/2001 | Reinoso | D9/686 |
| 6,299,369 | B1 | 10/2001 | Baines et al. | 401/75 |
| 6,321,923 | B1 * | 11/2001 | Wood | 215/235 |
| 6,779,689 | B2 * | 8/2004 | Flaig et al. | 222/182 |
| 6,837,405 | B2 | 1/2005 | Rainey et al. | |
| 2002/0030032 | A1 * | 3/2002 | Roemer | 215/317 |
| 2004/0140325 | A1 | 6/2004 | Flaig et al. | |
| 2006/0006129 | A1 * | 1/2006 | Baudin | 215/235 |
| 2008/0093327 | A1 * | 4/2008 | Stolle | 215/235 |

FOREIGN PATENT DOCUMENTS

| | | |
|---|---|---|
| DE | 87 08 695 | 1/1988 |
| EP | 1 561 701 A1 | 2/2004 |
| GB | 2 194 223 | 3/1988 |

OTHER PUBLICATIONS

International Search Report.
PCT Written Opinion.

* cited by examiner

*Primary Examiner*—Anthony Stashick
*Assistant Examiner*—Ned A Walker
(74) *Attorney, Agent, or Firm*—Milton L. Honig

(57) ABSTRACT

A package is provided including a container and a cap attached thereto. The container has an open and a closed end, the former having a dispensing opening surrounded by a shoulder. A pair of first buttresses are molded into the shoulder arranged along a cross-sectional major axis bisecting the opening. A pair of second buttresses are also molded into the shoulder and arranged along a minor axis bisecting the opening. Each of the buttresses have an upper edge tapering downwardly away from the opening. Upper edges of the second buttresses have a steeper taper angle than those of the first buttresses. The cap includes a lid hingedly connected to an edge of a fitment, the latter having a platform surrounded by a skirt wall and a product exit orifice formed in the platform. On a lower surface of the platform are four legs surrounding the orifice, projecting downwardly with each leg being asymmetrically shaped and lockingly fitted between first and second adjacent buttresses.

8 Claims, 4 Drawing Sheets

CONTAINER HAVING LOCKING BUTTRESSES FOR FLIP-TOP CAP

BACKGROUND OF THE INVENTION

1. Field of the Invention

The invention concerns packaging having a container fitted with a closure which is a low profile flip-top cap.

2. The Related Art

Oval or elliptical cross-section packaging is popular. We refer herein to such packaging as ovaloid. It is particularly used for personal care products such as skin lotions and creams, hair styling aids, conditioners and shampoos, and dental products. Consumer appeal is attributed to easier gripability of the container and often single-hand openability of the closures. Also unlike traditional round containers with screw-caps, the elliptical or oval configuration has producer/retailer benefits. Front facings of the ovaloid packages have greater surface area. Brand, promotional and other messages are thereby more visible and attract shoppers.

Many ovaloids for aesthetic reasons have eliminated shoulder breaks between container and cap. In other words, the container neck and shoulder is hidden under the skirt of an overcap. This camouflage has required vertically relatively long profile skirts. There are aesthetic, functional and environmental disadvantages. Modern designs are trending toward minimizing closure profile. A low profile closure also would leave more container surface for printing. Finally, environmental concerns seek to reduce the amount of plastic in packaging. Closures are a part of the package that has potential for being a plastic reduction source.

Illustrative of the traditional art is U.S. Pat. No. 6,837,405 B2 (Rainey et al.) wherein the container has a pair of buttresses along a major axis of the elliptical cross-section. These buttresses are on opposite sides of the container dispensing opening and are utilized to secure the cap. Additionally, the buttresses provide the container with enough structural resistance against top loads.

An object of the present invention is to provide a low profile flip-top cap which can be adequately secured around the opening of a container and which may provide one or more benefits including enhanced aesthetics, manufacturing benefits and reduction in plastic usage.

SUMMARY OF THE INVENTION

A package is provided which includes:

a container with a closed first end and opposite the first end a second end for dispensing a flowable product, the second end having a dispensing opening and a shoulder surrounding the opening, a pair of first buttresses molded into the shoulder arranged along a cross-sectional major axis of the container bisecting the opening, a pair of second buttresses molded into the shoulder arranged along a cross-sectional minor axis of the container bisecting the opening, each of the first and second buttresses having an upper edge tapering downwardly away from the opening, the upper edges of the second buttresses having a steeper taper angle than the upper edges of the first buttresses; and a cap attached to the second end of the container, the cap including a lid hingedly connected to an edge of a fitment, the fitment having a platform surrounded by a skirt wall, a product exit orifice formed in the platform communicating with the opening, the platform having a lower surface with four legs surrounding the orifice and projecting downwardly, each leg being asymmetrically shaped and lockingly fitted between adjacent first and second buttresses.

Containers of the present invention include plastic bottles, tottles (packages standing upside down which rest on a top surface of the cap) and tubes (heat or otherwise sealed at an end opposite the dispensing end). Plastics utilized for the container may include high or low density polyethylene, polypropylene, polyethylene terephthalate and polyamide. Most preferred are the polyethylene resins. Caps of the present invention may be formed of similar plastic materials but polypropylene is the preferred resin. In an aspect of this invention, areas of the cap through bi-injection or other processes may include an outer layer of a plastic with different feel properties. Particularly preferred is a plastomer layer adhered to parts of the thumb imprint area. This area is intended for applying human digital pressure to open the cap lid. Plastomers may have a melt flow-rate of from about 1 g/10 minutes to about 5 g/10 minutes, and tensile strength from about 1500 psi to about 3000 psi. Useful plastomers are copolymers of ethylene and $C_3$-$C_{20}$ alpha-olefin, commercially available as Exact 4033 from the Exxon Chemical Company.

An upper surface defining the shoulder of the container preferably has a varied curvature. Portions along the minor axis on front and rear faces of the container have a downward convex curvature. This results for those portions in a greater vertical distance from the dispensing opening than for those portions along the major axis.

The angle of taper for the upper edges of the first buttress relative to a horizontal plane through the dispensing opening preferably ranges from about 5 to about 40°, more preferably from 8 to 35°, and optimally from 10 to 25°. The corresponding angle of taper for the upper edges of the second buttresses preferably ranges from about 45 to about 80°, more preferably from 50 to 75°, and optimally from 55 to 70°. Each of the buttresses are formed with two slopes angled away from the upper edge. Slope angle is greater for the first buttresses than for the second buttresses.

A coupling ledge projects outward and at least partially surrounds the dispensing opening of the bottle. In a preferred embodiment, the coupling ledge is segmented by the buttresses into four quadrants.

Within the cap on an inward facing surface of the skirt wall are two pairs of guide rails. Each pair of guide rails is positioned opposite the other along the skirt wall. These rails also are adjacent to portions of the skirt wall which curve downwardly in the same direction as the projecting legs. The guide rails assist in nesting the caps within a capping machine. Further, these rails prevent deformation of the skirt walls post-molding by providing a stiffening influence.

A horizontally oriented inwardly projecting ridge or bead is featured on an inner surface of each of the four legs. These ridges or beads engage with the coupling ledge around the dispensing mouth. They snap into an undercut of the coupling ledge which insures locking of the cap to the container.

BRIEF DESCRIPTION OF THE DRAWING

Other features, advantages and objects of the present invention will become more evident from consideration of the following drawing in which.

DETAILED DESCRIPTION OF THE INVENTION

Figure 1:
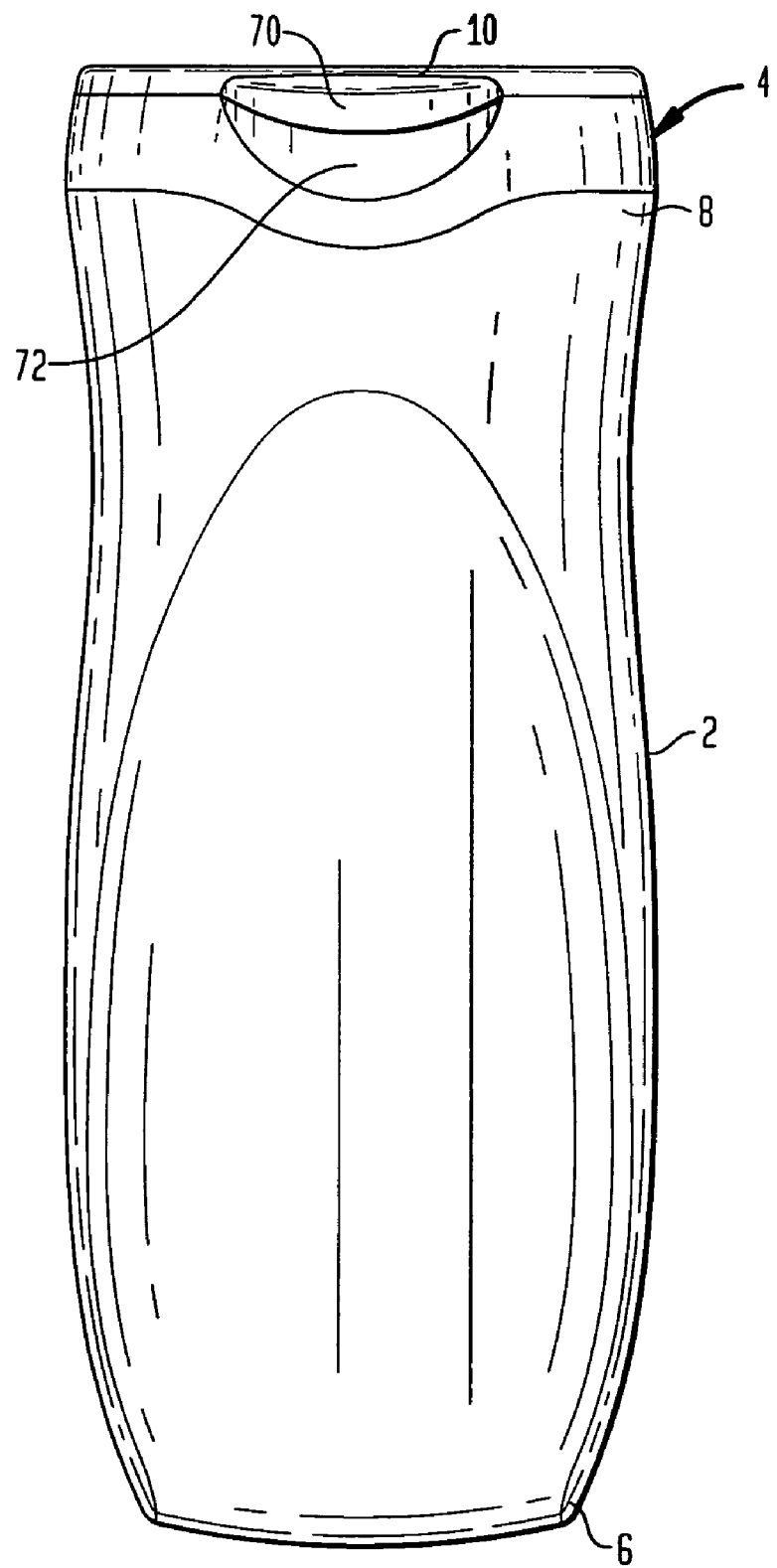
FIG. 1 is a front plan view of one embodiment of the present invention showing the low profile cap in a closed position on the container.

FIG. 1 is a first embodiment of the invention. This Figure illustrates a package which includes a container 2 serving as a receptacle for a flowable product and a cap 4. The container has a first end 6 which is closed and a second end 8 which is open allowing dispensing of the flowable product. An exterior of the container at the closed first end has a rounded structure rendering impossible the package to be stood erect along that surface. Instead, the package in a format known as a tottle stands erect on the flat top surface 10 of the cap. In an alternative embodiment (not shown) the container may be a traditional bottle which stands erect on a flat bottom surface of the bottle rather than on the cap.

Figure 2:
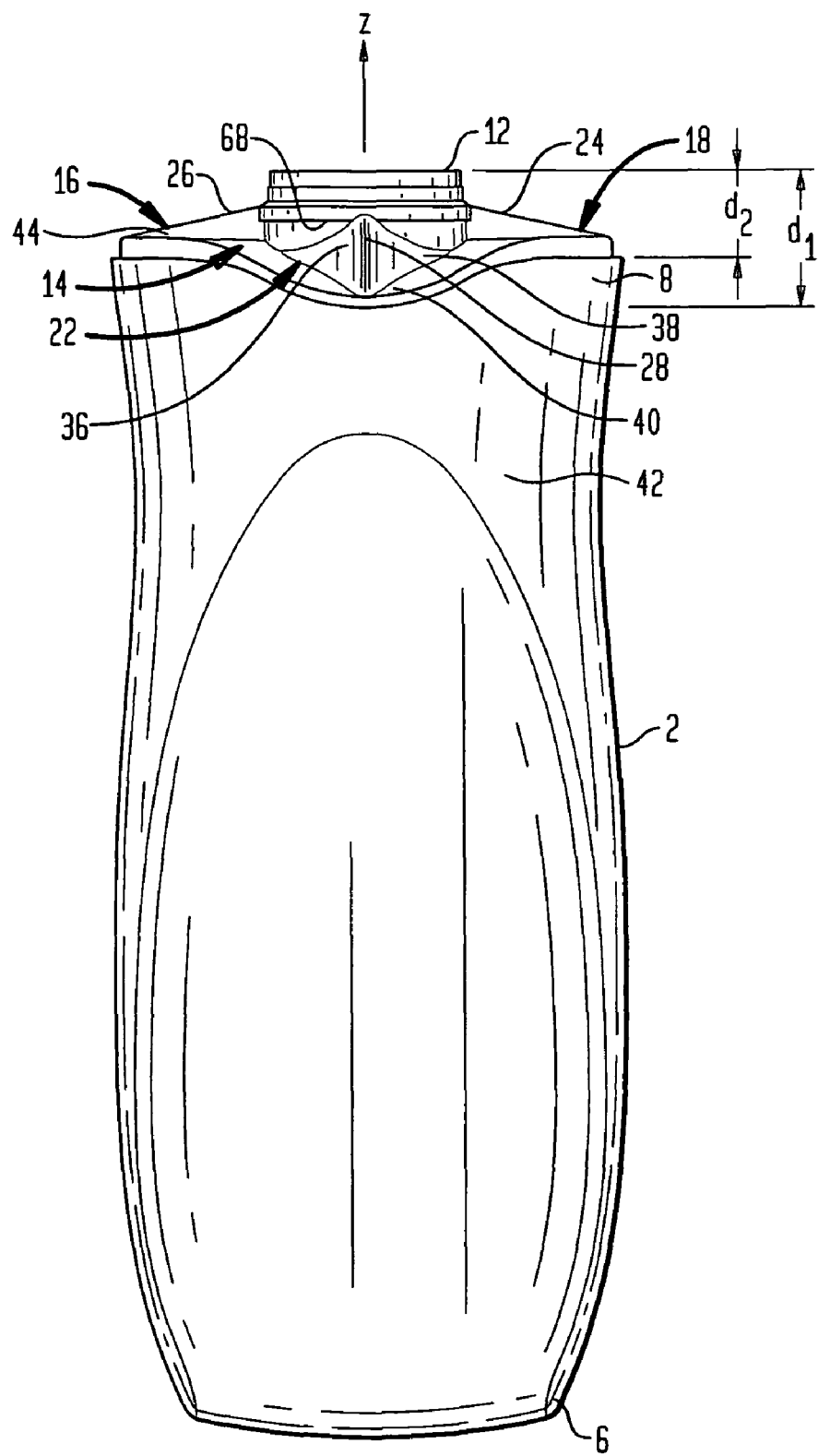
FIG. 2 is the container shown in FIG. 1 with the cap removed.

FIG. 2 reveals important structures along the second end of the container. In particular, a round dispensing opening 12 is centered along a major axis Z vertically traversing the container. Shoulder 14 surrounds the dispensing opening.

Figure 3:
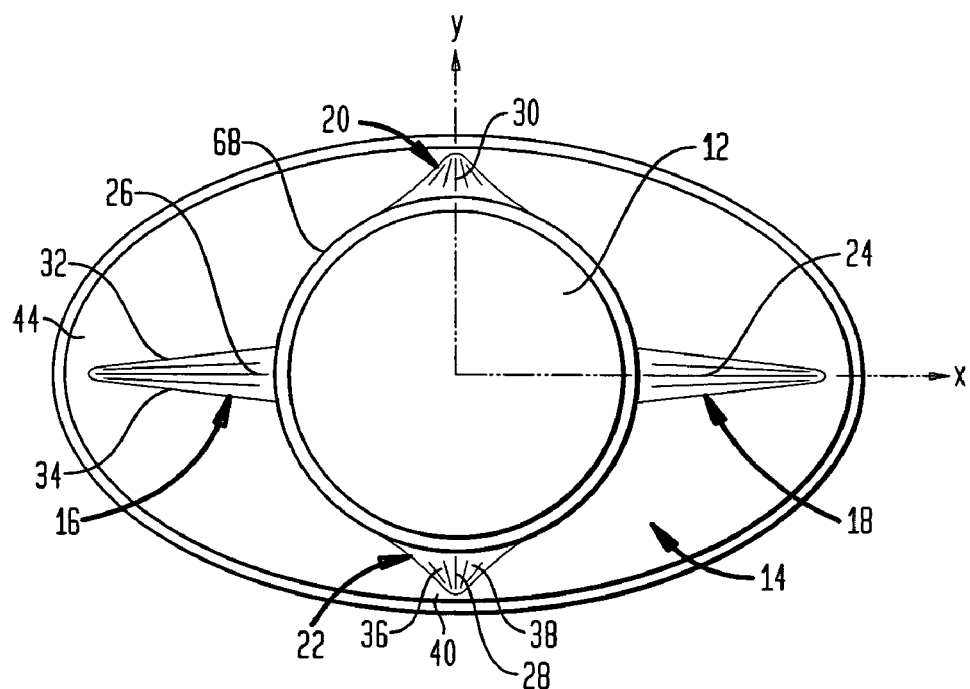
FIG. 3 is a top plan view of the embodiment shown in FIG. 2.

FIGS. 2 and 3 reveal a pair of first buttresses 16, 18 molded into the shoulder and displaced 180° opposite one another. Also present are a pair of second buttresses 20, 22 similarly molded into the shoulder. These second buttresses are also arranged along the dispensing opening 180° distant from one another and each 90° distant from either of the first buttresses. The pair of first and second buttresses lie respectively along a major axis X and a minor axis Y which bisect the dispensing opening.

The first and second buttresses each have an upper edge 24, 26 and 28, 30 respectively, tapering downwardly away from the opening. Upper edges 28, 30 of the second buttresses have a steeper taper angle than upper edges 24, 26 of the first buttresses.

Each of the buttresses are formed with two slopes angled away from their respective upper edge. For instance, the first buttress 16 has slopes 32 and 34 angled away from each other beginning at upper 20 edge 26. In similar fashion, second buttress 22 has slopes 36 and 38 angled away from each other beginning at upper edge 28. Slope angle for slopes of the first buttress are greater than the slope angles for slopes of the second buttresses. In other words, the first buttresses have a much narrower footprint than those of the wider spreading second buttresses.

Shoulder 14 is formed of an upper surface of varied curvature. Portions 40 of the shoulder along the minor axis on front (and rear) faces 42 of the container are at a greater vertical distance $d_1$ from the dispensing opening than portions 44 along the major axis (distance $d_2$).

Figure 4:
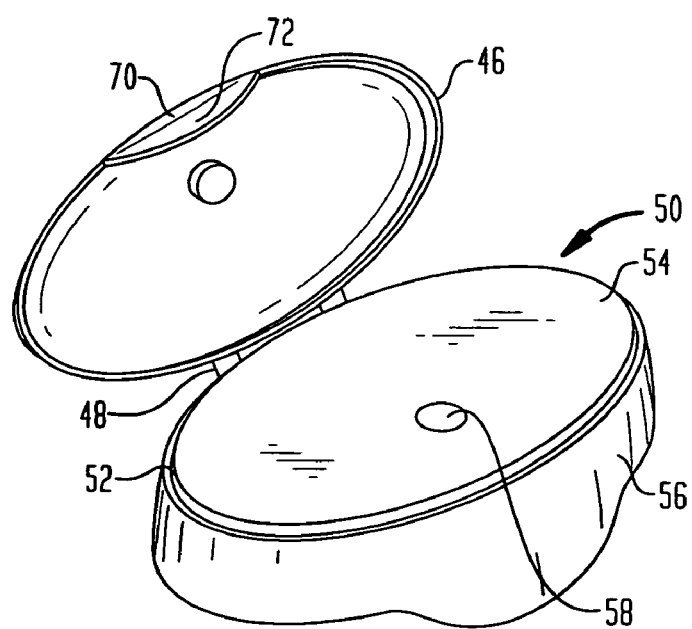
FIG. 4 is a perspective view of the cap with lid open according to the first embodiment.

FIG. 4 illustrates the cap 4 in an open position. A lid 46 is connected via a hinge 48 to a fitment 50 along an edge 52 of the fitment. The fitment includes a platform 54 surrounded by a skirt wall 56. A product exit orifice 58 is formed in the platform 54 and communicates with the dispensing opening 12.

Figure 5:
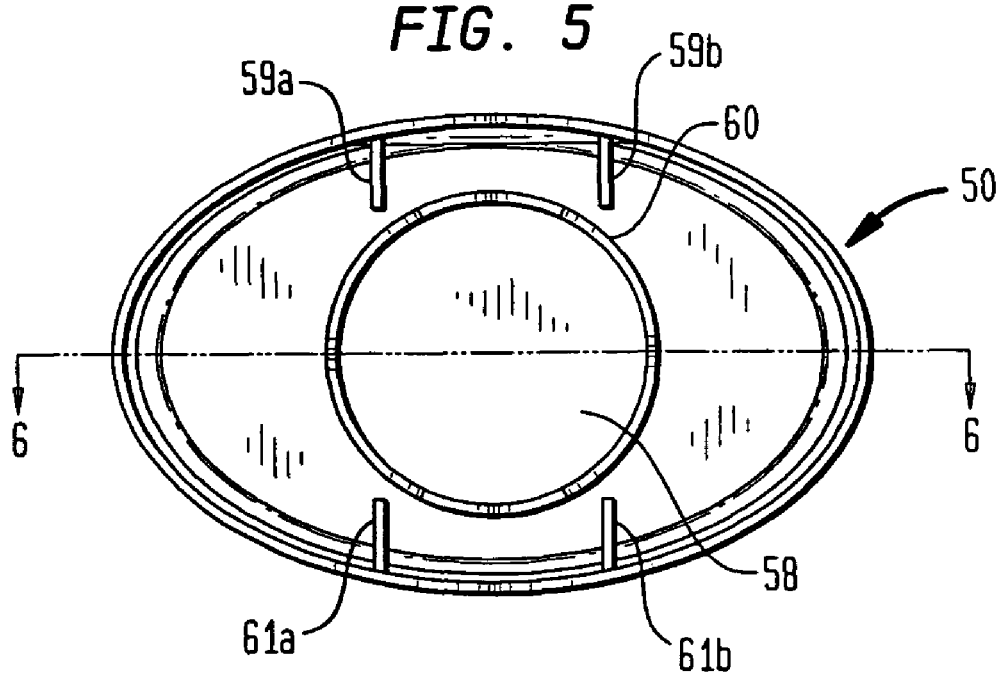
FIG. 5 is a bottom plan view of the cap according to the first embodiment.
Figure 6:
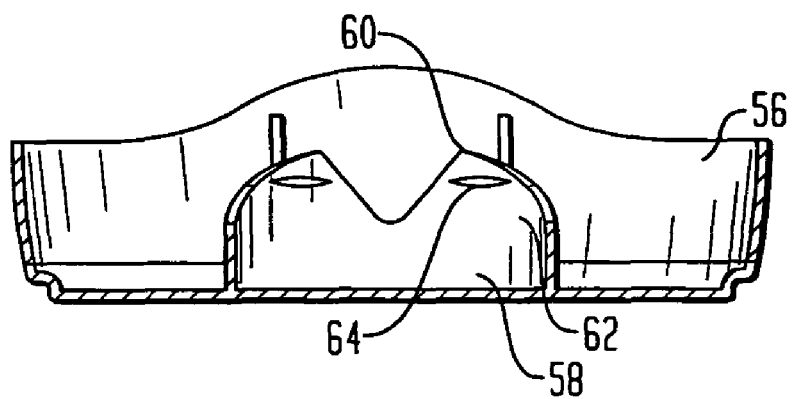
FIG. 6 is a cross-sectional view of the embodiment shown in FIG. 5.

FIGS. 5 and 6 illustrate a lower surface of the platform. Projecting therefrom are four legs 60. These surround the exit orifice. Each leg is asymmetrically shaped and lockingly fits between the first and second buttresses. An internal surface 62 of each leg 60 has a short bar or bead 64 projecting inwardly toward the exit orifice. Two sets of guide rails 59a, 59b and 61s, 61b project inwardly from an inward facing surface of the skirt wall 56.

Fitment and container are joined lockingly in the following manner. A coupling ledge 68 in four equal segments projects outward and at least partially surrounds the dispensing opening 12. Attachment involves placing fitment 50 over the shoulder 14 of the container. Downward pressure forces legs 60 to penetrate downward and along either side of the respective slopes of the four buttresses. This downward motion also forces the legs to flex outwardly allowing bars 64 to slide past ledge 68. An undercut of ledge 68 then catches an upper surface of the bar to lockingly fit together the container with the fitment (and thereby the cap).

Ease of opening lid 46 is assisted by the presence of a rubber layer 70 along a thumb indentation 72. The rubber layer preferably is of a different color than that of surrounding plastic walls. This allows the thumb indentation to be readily recognized as a pressure lever to open the lid. The rubber layer can be bi-injected with the cap. Suitable rubber layers are plastomers, normally softer than the plastics from which the container or cap is formed.

The term "comprising" is meant not to be limiting to any subsequently stated elements but rather to encompass non-specified elements of major or minor functional importance. In other words the listed steps, elements or options need not be exhaustive. Whenever the words "including" or "having" are used, these terms are meant to be equivalent to "comprising" as defined above.

What is claimed is:

1. A package comprising:

a container with a closed first end and opposite the first end a second end for dispensing a flowable product, the second end having a dispensing opening and a shoulder surrounding the opening, a pair of first buttresses molded into the shoulder arranged along a cross-sectional major axis of the container bisecting the opening, a pair of second buttresses molded into the shoulder arranged along a cross-sectional minor axis of the container bisecting the opening, each of the first and second buttresses having an upper edge tapering downwardly away from the opening, the upper edges of the second buttresses having a steeper taper angle than the upper edges of the first buttresses; and a cap attached to the second end of the container, the cap comprising a lid hingedly connected to an edge of a fitment, the fitment having a platform surrounded by a skirt wall, a product exit orifice formed in the platform communicating with the opening, the platform having a lower surface with four legs surrounding the orifice and projecting downwardly, each leg being asymmetrically shaped and lockingly fitted between adjacent first and second buttresses.

2. The package according to claim 1 further comprising a coupling ledge projecting outward and at least partially surrounding the opening.

3. The package according to claim 1 wherein the shoulder has an upper surface of varied curvature with portions along the minor axis on front and rear surfaces of the container being a greater vertical distance from the opening than portions along the major axis.

4. The package according to claim 1 wherein each buttress is formed with two slopes angled away from respective upper edges, slope angle being greater for the first buttresses relative to the second buttresses.

5. The package according to claim 1 wherein the cap has a thumb indentation area at least a portion of surface thereof being coated with a rubber layer.

6. The package according to claim 1 wherein the first end of the container is incapable of allowing the container to stand erect.

7. The package according to claim 1 wherein the upper edges of the first buttress have a taper angle ranging from about 5 to about 40°.

8. The package according to claim 1 wherein the upper edges of the second buttress have a taper angle ranging from about 45 to about 80°.

* * * * *